(12) United States Patent
Chandrasekaran et al.

(10) Patent No.: US 11,847,612 B2
(45) Date of Patent: *Dec. 19, 2023

(54) SOCIAL MEDIA PROFILING FOR ONE OR MORE AUTHORS USING ONE OR MORE SOCIAL MEDIA PLATFORMS

(71) Applicant: NASDAQ, Inc., New York, NY (US)

(72) Inventors: Deepak Chandrasekaran, London (GB); David Costello, Ilford (GB); Paul Stubbs, Wyboston (GB)

(73) Assignee: NASDAQ, INC., New York, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/380,284

(22) Filed: Jul. 20, 2021

(65) Prior Publication Data
US 2021/0350323 A1  Nov. 11, 2021

Related U.S. Application Data

(63) Continuation of application No. 16/392,860, filed on Apr. 24, 2019, now Pat. No. 11,100,466, which is a
(Continued)

(51) Int. Cl.
*G06F 16/951* (2019.01)
*G06F 16/9535* (2019.01)
(Continued)

(52) U.S. Cl.
CPC ........... *G06Q 10/10* (2013.01); *G06F 16/951* (2019.01); *G06F 16/9535* (2019.01);
(Continued)

(58) Field of Classification Search
CPC ... G06F 16/951; G06F 16/9535; G06Q 50/01; G06Q 10/10; H04L 67/306; H04W 4/21
See application file for complete search history.

(56) References Cited

U.S. PATENT DOCUMENTS 6,728,707 B1  4/2004  Wakefield et al.
6,732,097 B1  5/2004  Wakefield et al.
(Continued)

FOREIGN PATENT DOCUMENTS

EP  2302533  3/2011
GB  2412196  9/2005
(Continued)

OTHER PUBLICATIONS

International Search Report dated Dec. 19, 2013 for PCT/SE2013/050464.

*Primary Examiner* — Taelor Kim
(74) *Attorney, Agent, or Firm* — Nixon & Vanderhye, PC

(57) ABSTRACT

A system is presented that profiles authors and social media data across different media platforms and is capable of determining the author's overall social impact. In one aspect, this is accomplished by using a data retrieval service to trawl various web-sites and social media platforms for information about authors which can then be associated with those authors in a profile database. In one example, an author may post an entry on his/her blog and the data retrieval service can access the profile information of the author, on the blog, where various aspects of the profile information (e.g., real name, employee information, home address) can be matched with candidates in a profile database. From the information gathered, authors can be linked across multiple, different platforms, and an overall social impact of each of the authors can be determined.

20 Claims, 6 Drawing Sheets

Related U.S. Application Data continuation of application No. 13/465,335, filed on May 7, 2012, now Pat. No. 10,304,036.

(51) Int. Cl.
*G06Q 10/10* (2023.01)
*H04L 67/306* (2022.01)
*G06Q 50/00* (2012.01)
*H04W 4/21* (2018.01)

(52) U.S. Cl.
CPC .......... *G06Q 50/01* (2013.01); *H04L 67/306* (2013.01); *H04W 4/21* (2018.02)

(56) References Cited

U.S. PATENT DOCUMENTS

| | | | |
|---|---|---|---|
| 6,732,098 | B1 | 5/2004 | Wakefield et al. |
| 6,738,765 | B1 | 5/2004 | Wakefield et al. |
| 6,741,988 | B1 | 5/2004 | Wakefield et al. |
| 7,171,349 | B1 | 1/2007 | Wakefield et al. |
| 7,428,528 | B1 | 9/2008 | Ferrari et al. |
| 7,472,427 | B2 | 12/2008 | Shimojima et al. |
| 7,600,017 | B2 | 10/2009 | Holtzman et al. |
| 7,660,783 | B2 | 2/2010 | Reed |
| 7,720,835 | B2 | 5/2010 | Ward et al. |
| 7,792,841 | B2 | 9/2010 | McAllister et al. |
| 7,814,043 | B2 | 10/2010 | Uchino |
| 7,849,048 | B2 | 12/2010 | Langseth et al. |
| 7,865,394 | B1 | 1/2011 | Calloway et al. |
| 7,877,345 | B2 | 1/2011 | Nigam et al. |
| 7,930,302 | B2 | 4/2011 | Bandaru et al. |
| 7,966,241 | B2 | 6/2011 | Nosegbe |
| 7,974,983 | B2 | 7/2011 | Goeldi |
| 7,984,428 | B1 | 7/2011 | Seymour |
| 8,010,524 | B2 | 8/2011 | Chen et al. |
| 8,225,413 | B1 | 7/2012 | De et al. |
| 2002/0083039 | A1 | 6/2002 | Ferrari et al. |
| 2003/0101166 | A1 | 5/2003 | Uchino et al. |
| 2004/0167870 | A1 | 8/2004 | Wakefield et al. |
| 2004/0167883 | A1 | 8/2004 | Wakefield et al. |
| 2004/0167884 | A1 | 8/2004 | Wakefield et al. |
| 2004/0167885 | A1 | 8/2004 | Wakefield et al. |
| 2004/0167886 | A1 | 8/2004 | Wakefield et al. |
| 2004/0167887 | A1 | 8/2004 | Wakefield et al. |
| 2004/0167907 | A1 | 8/2004 | Wakefield et al. |
| 2004/0167908 | A1 | 8/2004 | Wakefield et al. |
| 2004/0167909 | A1 | 8/2004 | Wakefield et al. |
| 2004/0167910 | A1 | 8/2004 | Wakefield et al. |
| 2004/0167911 | A1 | 8/2004 | Wakefield et al. |
| 2004/0215634 | A1 | 10/2004 | Wakefield et al. |
| 2005/0027629 | A1 | 2/2005 | DeBreed et al. |
| 2005/0038781 | A1 | 2/2005 | Ferrari et al. |
| 2005/0108256 | A1 | 5/2005 | Wakefield et al. |
| 2006/0053104 | A1 | 3/2006 | Ferrari et al. |
| 2007/0011183 | A1 | 1/2007 | Langseth et al. |
| 2007/0083505 | A1 | 4/2007 | Ferrari et al. |
| 2007/0100875 | A1 | 5/2007 | Chi et al. |
| 2008/0072256 | A1 | 3/2008 | Boicey et al. |
| 2008/0134100 | A1 | 6/2008 | Ferrari et al. |
| 2008/0154698 | A1 | 6/2008 | Flake et al. |
| 2008/0154883 | A1 | 6/2008 | Chowdhury et al. |
| 2008/0228695 | A1 | 9/2008 | Sifry et al. |
| 2008/0256093 | A1 | 10/2008 | Amitay et al. |
| 2009/0048904 | A1 | 2/2009 | Newton et al. |
| 2009/0106697 | A1 | 4/2009 | Ward et al. |
| 2009/0119156 | A1 | 5/2009 | Dulepet |
| 2009/0119157 | A1 | 5/2009 | Dulepet |
| 2009/0119173 | A1 | 5/2009 | Parsons et al. |
| 2009/0125482 | A1 | 5/2009 | Peregrine et al. |
| 2009/0164266 | A1 | 6/2009 | Lakhani et al. |
| 2009/0319518 | A1 | 12/2009 | Koudas et al. |
| 2010/0049590 | A1 | 2/2010 | Anshul |
| 2010/0070485 | A1 | 3/2010 | Parsons et al. |
| 2010/0082695 | A1 | 4/2010 | Hardt |
| 2010/0088313 | A1* | 4/2010 | Hoffman ............... H04L 67/306 707/E17.108 |
| 2010/0114899 | A1 | 5/2010 | Guha et al. |
| 2010/0119053 | A1 | 5/2010 | Goeldi |
| 2010/0121707 | A1 | 5/2010 | Goeldi |
| 2010/0169159 | A1 | 7/2010 | Rose et al. |
| 2010/0205663 | A1 | 8/2010 | Ward et al. |
| 2010/0241620 | A1 | 9/2010 | Manister et al. |
| 2010/0275128 | A1* | 10/2010 | Ward ..................... G06Q 10/10 715/744 |
| 2010/0325107 | A1 | 10/2010 | Ward et al. |
| 2010/0287136 | A1 | 11/2010 | Fortuna, Jr. et al. |
| 2010/0332465 | A1 | 12/2010 | Janssens et al. |
| 2011/0029926 | A1 | 2/2011 | Hao et al. |
| 2011/0047035 | A1 | 2/2011 | Gidwani et al. |
| 2011/0078157 | A1 | 3/2011 | Sun et al. |
| 2011/0078584 | A1 | 3/2011 | Winterstein et al. |
| 2011/0106589 | A1 | 5/2011 | Blomberg et al. |
| 2011/0106807 | A1 | 5/2011 | Srihari et al. |
| 2011/0144971 | A1 | 6/2011 | Danielson |
| 2011/0145219 | A1 | 6/2011 | Cierniak et al. |
| 2011/0191372 | A1 | 8/2011 | Kaushansky et al. |
| 2011/0282860 | A1 | 11/2011 | Baarman et al. |
| 2011/0282890 | A1* | 11/2011 | Griffith ............. G06F 16/24573 707/758 |
| 2012/0047219 | A1* | 2/2012 | Feng ..................... G06F 16/951 707/661 |
| 2012/0179752 | A1 | 7/2012 | Mosley et al. |
| 2012/0215903 | A1* | 8/2012 | Fleischman ........ H04N 21/8126 709/224 |
| 2012/0254333 | A1 | 10/2012 | Chandramouli et al. |
| 2013/0103667 | A1 | 4/2013 | Minh |
| 2013/0110583 | A1 | 5/2013 | Ormont et al. |
| 2013/0110928 | A1* | 5/2013 | Ghosh ..................... G06Q 30/02 709/204 |
| 2013/0138428 | A1 | 5/2013 | Chandramouli et al. |

FOREIGN PATENT DOCUMENTS

| | | |
|---|---|---|
| HK | 1072114 | 11/2009 |
| WO | WO0139065 | 5/2001 |
| WO | WO0246997 | 6/2002 |
| WO | WO02097671 | 12/2002 |
| WO | WO03027901 | 4/2003 |
| WO | WO03027902 | 4/2003 |
| WO | WO03054746 | 7/2003 |
| WO | WO2004053645 | 6/2004 |
| WO | WO2005026992 | 3/2005 |
| WO | WO2005076175 | 8/2005 |
| WO | WO2006039566 | 4/2006 |
| WO | WO2007015990 | 2/2007 |
| WO | WO2007058863 | 5/2007 |
| WO | WO2007101263 | 9/2007 |
| WO | WO2008039542 | 4/2008 |
| WO | WO2008067554 | 6/2008 |
| WO | WO2009003050 | 12/2008 |
| WO | WO2009023865 | 2/2009 |
| WO | WO2009105277 | 8/2009 |
| WO | WO2009155375 | 12/2009 |
| WO | WO2010065199 | 6/2010 |

\* cited by examiner

SOCIAL MEDIA PROFILING FOR ONE OR MORE AUTHORS USING ONE OR MORE SOCIAL MEDIA PLATFORMS

CROSS-REFERENCE TO RELATED APPLICATIONS

This application is a continuation of U.S. patent application Ser. No. 16/392,860, filed Apr. 24, 2019, which is a continuation of U.S. patent application Ser. No. 13/465,335 filed May 7, 2012. The entire contents of each of which are incorporated herein by reference for all purposes.

BACKGROUND

The Internet and social media platforms (e.g., Facebook®, Twitter®, blogs) provide authors with an easy-to-use interface for conveying information and opinions. Authors can log-on to these platforms from their personal computers, cell phones, or other communication devices and convey information available to the world within seconds.

Many authors convey information across multiple platforms. For example, an individual may have a Twitter® account, a Facebook® account, and a blog for conveying information. Thus, a author may post an opinion on Facebook® using his/her Facebook® account and then post a similar or related opinion on his/her blog.

Sentiment analysis technology takes advantage of these media and platforms and uses sophisticated tools for analyzing the author data for particular "sentiment" (the term sentiment can refer to an attitude, opinion, and/or emotion towards a particular topic). For example, a author may post on a blog their fondness of the new Apple iPhone®. They could likewise log into their Twitter® account and post a similar opinion. Sentiment analysis extracts this data from the various social media platforms and analyzes it to determine information about the author and associate the author and his/her opinion with a particular sentiment. However, when the author posts opinions on a topic using multiple, different social media platforms, it is difficult to adequately link the author across platforms and determine the author's overall social impact in the world. This is especially true when the author's identity is not as apparent on a particular platform. For example, an author may use his/her real name when posting entries on Facebook but may use a pseudonym when posting entries on his/her blog. Thus, it would be advantageous to profile the authors on the different social media platforms and automatically link the authors across the multiple, different platforms to determine their overall social impact.

SUMMARY OF THE TECHNOLOGY

A system is presented that profiles authors and social media data across different media platforms and is capable of determining the author's overall social impact. In one aspect, this is accomplished by using a data retrieval service to trawl various web-sites and social media platforms for information about authors which can then be associated with those authors in a profile database. In one example, an author may post an entry (or a composition) on his/her blog and the data retrieval service can access the profile information of the author, on the blog, where various aspects of the profile information (e.g., real name, employee information, home address) can be matched with candidates in a profile database. From the information gathered, authors can be linked across multiple, different platforms, and an overall social impact of each of the authors can be determined.

A method for analyzing and evaluating social media data, to determine a social impact of author comments on one or more topics, using an information processing apparatus having one or more processors is presented. The method comprises determining a first sentiment on a first composition on a topic composed by an author using a first social media device, determining a second sentiment on a second composition on a related topic by an author using a second social media device, determining whether the author using the first social media device is the same author as the author using the second social media device, comparing the first sentiment of the author of the first composition with the second sentiment of the author of the second composition based on whether the author using the first social media device is the same author as the author using the second social media device, scoring, via the one or more processors, the first sentiment of the author of the first composition based on the comparison between the first sentiment and the second sentiment, and determining a social impact of the author based on the scored sentiment.

A non-transitory computer-readable storage medium having computer readable code embodied therein which, when executed by a computer having one or more processors, performs the method for analyzing social media data of the preceding paragraph.

The technology also relates to an information processing apparatus having a memory configured to store social media data and one or more processors, coupled to the memory, configured to analyze and evaluate social media data to determine a social impact of author comments on one or more topics. The one or more processors in the information processing apparatus are further configure to determine a first sentiment on a first composition on a topic composed by an author using a first social media device, determine a second sentiment on a second composition on a related topic by an author using a second social media device, determine whether the author using the first social media device is the same author as the author using the second social media device, compare the first sentiment of the author of the first composition with the second sentiment of the author of the second composition based on whether the author using the first social media device is the same author as the author using the second social media device, score the first sentiment of the author of the first composition based on the comparison between the first sentiment and the second sentiment, and determine a social impact of the author based on the scored sentiment.

The technology also relates to an information processing system having one or more social media devices and an information processing apparatus. The one or more social media devices having a memory configured to store social media data, one or more processors configured to process social media data, and a transceiver configured to transmit/receive social media data. The information processing apparatus having a memory configured to store social media data, a transceiver configured to transmit/receive social media data, and one or more processors, coupled to the memory, configured to analyze and evaluate social media data to determine a social impact of author comments on one or more topics. The one or more processors in the information processing apparatus are further configured to determine a first sentiment on a first composition on a topic composed by an author using a first social media device, determine a second sentiment on a second composition on a related topic by an author using a second social media device, determine whether the author using the first social media device is the same author as the author using the second social media device, compare the first sentiment of the author of the first composition with the second sentiment of the author of the second composition based on whether the author using the first social media device is the same author as the author using the second social media device, score the first sentiment of the author of the first composition based on the comparison between the first sentiment and the second sentiment, and determine a social impact of the author based on the scored sentiment.

In a non-limiting, example implementation a first profile of the first author on the first social media device is accessed, information about the first author is collected based on the first profile, a second profile of the second author on the second social media device is accessed, information about the second author is collected based the second profile, the collected information based on the first profile is compared with the collected information based on the second profile to determine if the first author is the same author as the second author, and scored sentiment of the first author and the second author are aggregated to produce an overall sentiment thereby determining the social impact of the first and second author.

In another non-limiting, example implementation the first and second profile includes at least one of a username of the authors, an age of the authors, a gender of the authors, a household income of the authors, career information of the authors, a location of the authors, a legal name of the authors, a pseudonym of the authors, and/or an ethnicity of the authors.

In yet another non-limiting, example implementation the first and second profile includes at least one of a username of the authors, an age of the authors, a gender of the authors, a household income of the authors, career information of the authors, a location of the authors, a legal name of the authors, a pseudonym of the authors, and/or an ethnicity of the authors.

In another non-limiting, example implementation the social media device comprises at least one of publications, social media websites, forums, blogs, radio broadcasts, and/or television broadcasts.

In yet another non-limiting, example implementation the first sentiment of the first author relates to a positive, negative, or neutral sentiment of the first author of the first composition, the first social media device is different than the second social media device, and the related topic is the same topic.

In another non-limiting, example implementation a higher score is given to the first sentiment of the first author when the first sentiment of the first author is opposite to the second sentiment of the second author on the second composition of the related topic.

In yet another non-limiting, example implementation a higher score is given to the first sentiment of the first author when the first sentiment of the first author is the same as the second sentiment of the second author on the second composition of the related topic.

DETAILED DESCRIPTION OF THE TECHNOLOGY

Figure 1:
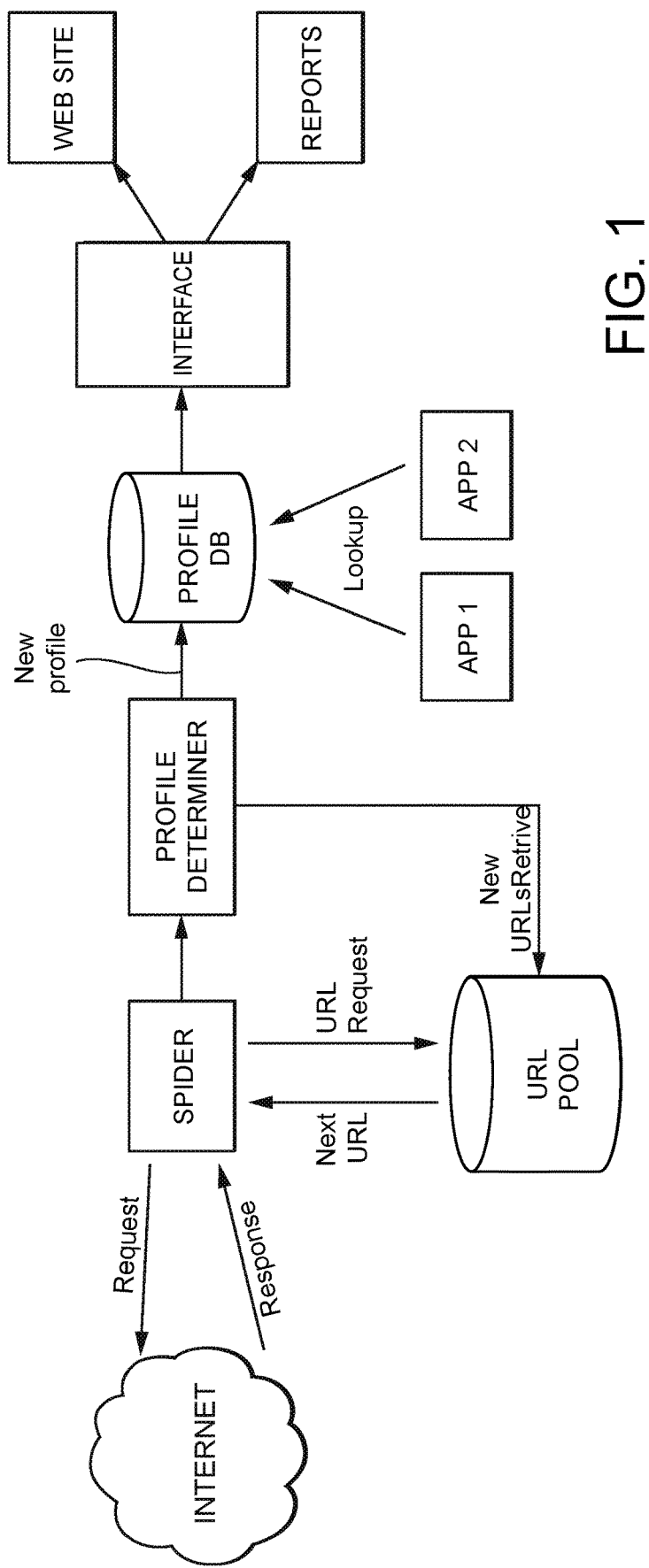
FIG. 1 is a diagram of an example embodiment of a social media profiling system.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data. Also, any reference to the term "non-transitory" is intended only to exclude subject matter of a transitory signal per se. The term "non-transitory" is not intended to exclude computer readable media such as volatile memory (e.g. random access memory or RAM) or other forms of storage that are not excluded subject matter.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred. The apparatus that performs the process may include, e.g., a processor and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

The technology described herein is directed to a social media profiling system that profiles authors (also referred to herein as "users") that use various social media platforms. Such profiling is useful to clients that provide services, sell products, etc. In an example embodiment, a set of web crawling services trawl the World Wide Web for user accounts from popular social networking websites and other Internet based services. It should be appreciated that the term "trawl" can generally refer to accessing/sifting through large volumes of data, archives, and/or looking for something of interest.

From information collected in the search, commonalities such as shared username, or links to other author profiles are used to build a more comprehensive understanding of the author, the size of the author's social circles and ultimately, the author's potential social value to the client. From this information gathered, a client can determine whether an author posting a positive or negative comment, article, etc. related to one or more of the client's products or services might influence the general public, for example.

One illustrative example uses a comedian, who has a dominant following on Twitter® and Facebook®. Assume the comedian is an Apple® fan, and generally posts positive reviews of Apple® products. His comments might reach millions of followers, who may be influence by his posts to seek products and/or services from Apple®.

A web crawler service can be used to target a specific form of social community on the World Wide Web. One example is a social focal point like Twitter® or Facebook®, or other Internet based services such as vBulletin forums, or WordPress blogs.

The web crawler can visit the target website to detect "mentions" of usernames (or a profile page). If a profile page is found, then the crawler collects all public information about the target author for storage in a database. The web crawler also attempts to identify potential links to other author profiles that belong to the target author, which allows the system to link different author profiles from different sites together to build a more comprehensive picture of the target author. Information such as the amount of posts and the number of friends the author has is recorded to help determine the target author's likely social value on the website.

Web crawlers can be customized to target specific sites and products. For example, if a crawler designed to crawl over the Twitter® website may only be able to crawl Twitter®, then a separate crawler would be needed to crawl Facebook®. However, a crawler built to crawl vBulletin forums may be configured to crawl multiple websites implementing vBulletin forums. Some of the information that may be obtained from crawling may include, but is not limited to, user post data and/or user background data.

The content retrieved by the web crawlers can be used to populate one or more databases. Once the content is retrieved, the system can then attempt to analyze records, for one or more relations to other collected author profiles. This can be done based on username similarity or mutual links mentioned in profiles, for example.

With data collected from the web crawlers, additional crawlers can be deployed to periodically revisit and update the information collected on the authors. This allows the system to maintain current data on target authors, and also allows for the identification of additional details, like the rate of posting, the trend in friends (if the author is gaining or losing audience), and depending on the target website/product, possibly information on the topics that the author is interested in.

With information gathered on authors, one or more weights can be assessed to a post by the author based on the topics the author posts about, their likely influence over their followers, and the volume of audience. An author may also post differently for different companies. Using the example above, if the author favors Apple®, a negative post about Apple® from the author may be more negatively weighted given that this author's reviews are normally positive for Apple®. A greater weighting may also be provided when a critic of a company or product favors, for example, the latest product/move from the company.

It should be appreciated that the system is not limited to profiling social media platforms and can profile all forms of media including, but not limited to, social media, print, online web and broadcast data. It should also be appreciated that that the social impact is not only linked to sentiment and can also take into account details of the content and text written by an author to determine the social impact of the author and whether or not it is the same author. By doing this, several pieces of information can be captured across media types including topic, sentiment, author name, and "spidered" information from online journalist contact sites to make the comparison and find a match.

FIG. 1 is a diagram of an example embodiment of a social media profiling system. A web crawler, or Spider, is deployed to search various social media web-sites (e.g., Facebook®, Twitter®) and/or blogs and retrieve author posts and information regarding the author. The Spider can employ a URL pool to direct the Spider to various URLs in order to retrieve posts and author profile information. That is, the URL pool can be configured as a list of URLs containing author information. This allows the Spider to focus just on sites that will return the most valuable journalist data.

Upon retrieving the profile information using the Spider, the information can be processed by a profile determiner which will determine if there is a match of the profile in the profile database DB. As explained further below, if no match is found, a new profile is created, and if a match is found, the profile is linked with the profile in the profile database DB. A user interface can also be provided to generate reports and/or provide information via a website, for example, to show the author's overall social impact.

Applications (APP1, APP2) can also be used by the system to make use of the journalist information. For example, one application could be a Press Relations platform which needs journalist contact information to distribute information to/from. If the information is comprehensive, it allows for target email distribution of corporate information. Another application could be a media monitoring application that may require the data to provide valuable information on a journalist for a user who is analyzing press mentions on an organization.

Figure 2:
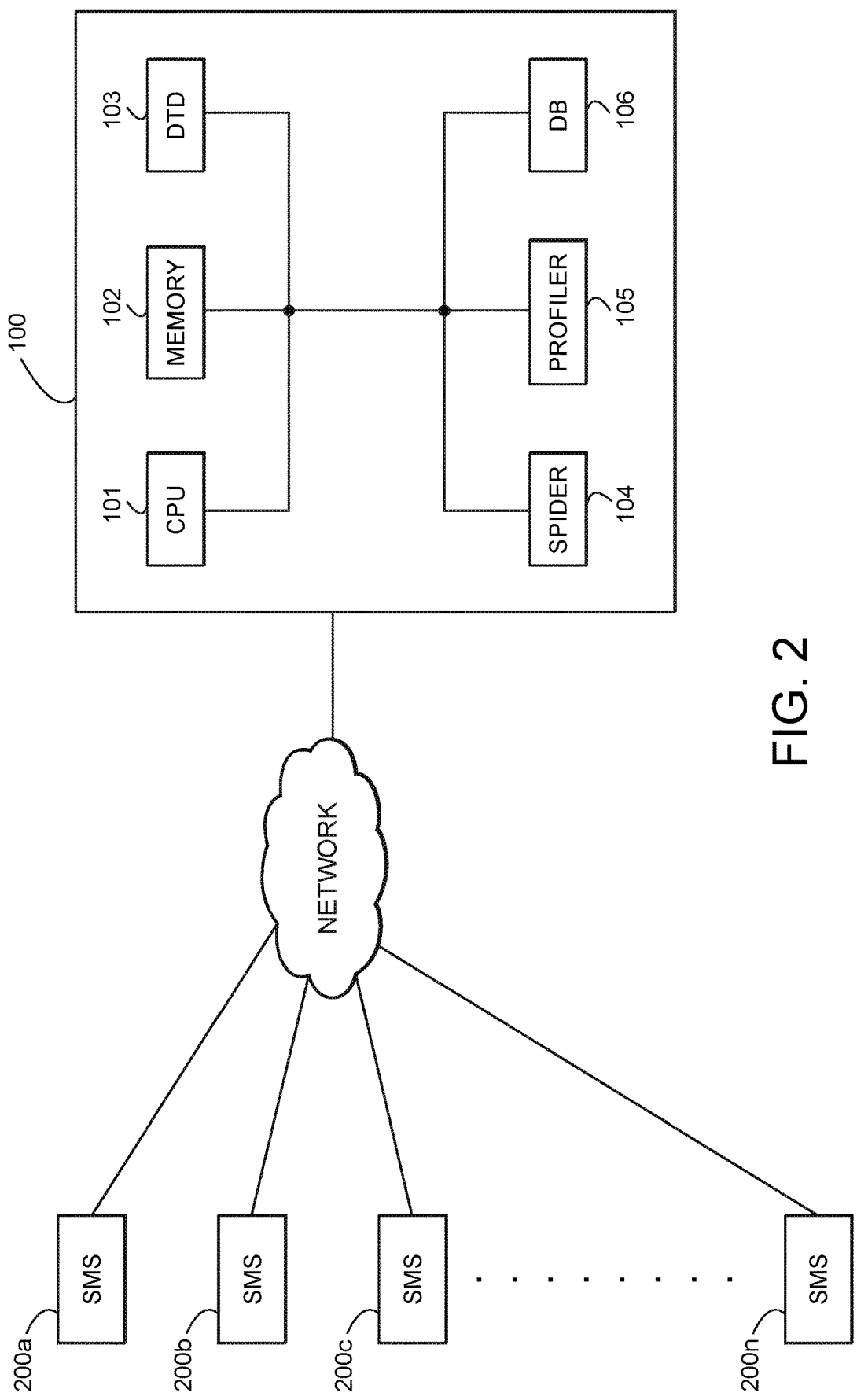
FIG. 2 is a block diagram of an example embodiment of a social media profiling apparatus interacting with one or more social media sources.

FIG. 2 shows a block diagram of an example embodiment of a social media profiling apparatus interacting with one or more social media sources. In FIG. 2, a social media profiling apparatus 100 can be configured to have a CPU 101, a memory 102, and a data transmission device DTD 103. The DTD 103 can be, for example, a network interface device that can connect the social media profiling apparatus 100 to one or more social media sources 200a-n. The connection can be wired, optical, or wireless and can connect over a Wi-Fi network, the Internet, or a cellular data service, for example. The DTD 103 can also be an input/output device that allows the apparatus 100 to place the data on a computer-readable storage medium. It should be appreciated that the data transmission device 103 is capable of sending and receiving data (i.e. a transceiver).

The social media profiling apparatus 100 is also configured to have one or more spiders 104, profilers 105, and profile databases DB 106. As explained further below, the spiders 104 are configured to trawl the various social media sources 200*a-n* in order to obtain information on authors using the sources 200*a-n*. The spiders 104 can access information from the sources 200*a-n* via a network, such as the Internet, and can be configured to access the sources 200*a-n* using the DTD 103.

Figure 3:
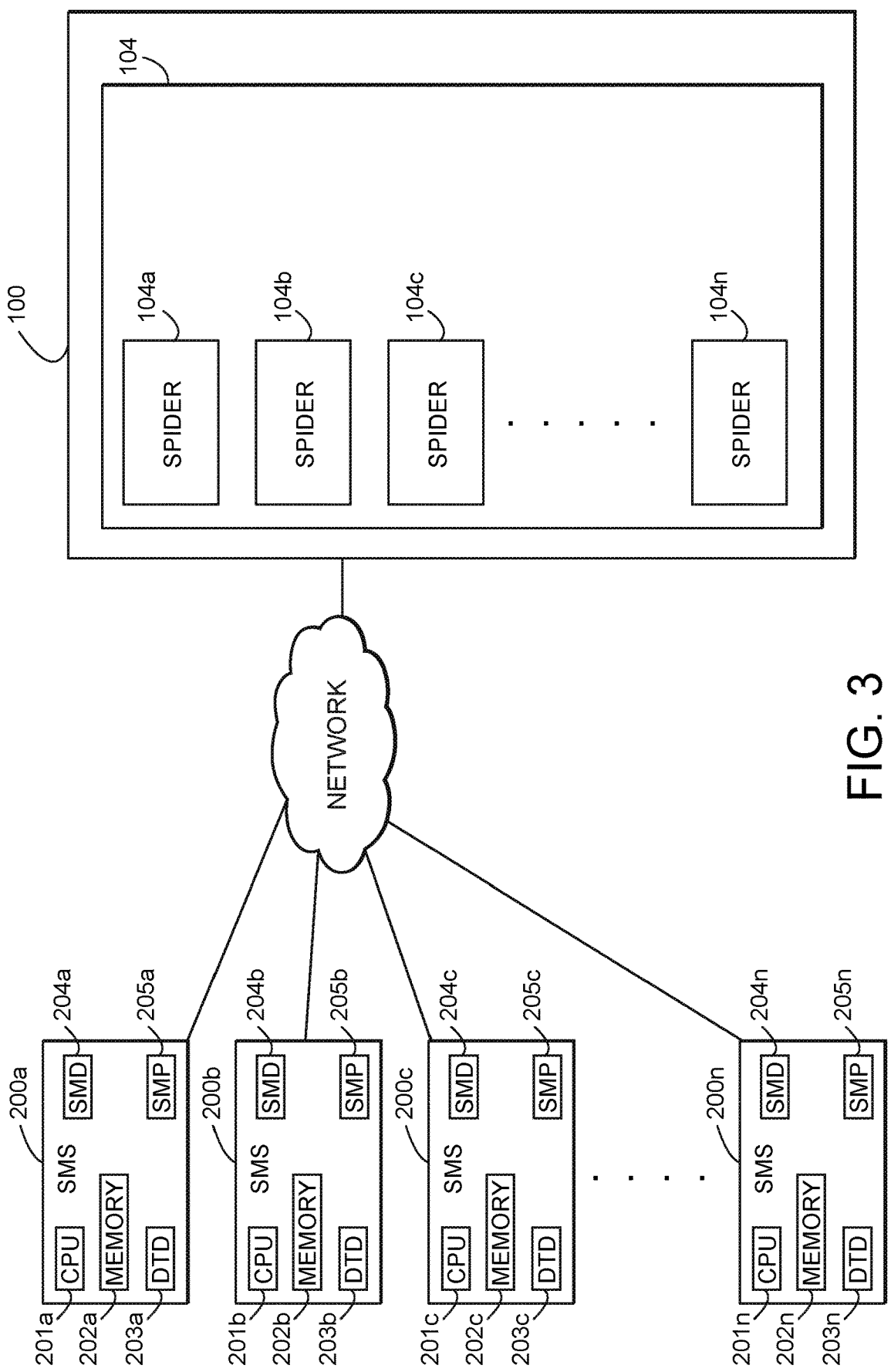
FIG. 3 is a block diagram of an example embodiment of one or more spiders retrieving data from one or more social media sources.

FIG. 3 is a block diagram of an example embodiment of one or more spiders retrieving data from one or more social media sources. As explained above, the apparatus 100 can be configured to have one or more spiders 104*a-n* that trawl the social media sources 200*a-n* for data. It should be appreciated that each social media source 200*a-n* may have a CPU 201, a memory 202, and a DTD 203. Much like the DTD 103, the DTD 203 can be, for example, a network interface device that can connect the social media sources 200*a-n* to the social media profiling apparatus 100. The connection can be wired, optical, or wireless and can connect over a Wi-Fi network, the Internet, or a cellular data service, for example. The DTD 203 can also be an input/output device that allows the sources 200*a-n* to place the data on a computer-readable storage medium. It should be appreciated that the data transmission device 203 is capable of sending and receiving data (i.e. a transceiver).

In an example embodiment, each social media source 200*a-n* can also be configured to have social media data 204*a-n* and/or a social media profile 205*a-n*. The social media data 204*a-n* can be, for example, an author post, such as a comment on Facebook® or can be a blog entry. In an example embodiment, the social media 204*a-n* will be an author post that is commenting on a particular topic and has an author associated with the post. In an example embodiment, the social media profile 205*a-n* can be a profile of the author for the post. For example, Facebook® may have an author profile associated with the author of the particular post. The author profile information can be stored in the social media profile 205*a-n* where a spider 104*a-n* can access both the social media data 204*a-n* and the social media profile 205*a-n* associated with the data 204*a-n*.

Using the example from above, an author may have an account with Facebook®. With this account, the author may have various background information stored in his/her profile on Facebook®. For example, the author's gender, age, ethnicity, location of birth, present location, employer, and/or full legal name (among many other segments of information related to the author's background) may be associated with the author's account. The very same comedian may also have a Twitter® account where he posts information. Likewise, his Twitter® account will also have background information stored in his profile. By having access to the profile accounts for Facebook® and Twitter®, the background information can be analyzed to attempt to determine a link between authors. Thus, such a system is advantageous where it may not be apparent to a sentiment analysis system that two separate accounts on different social media platforms are for the very same individual. That is, the sentiment analysis system may link the profiles of authors and perform sentiment analysis taking into account the identity of the author. From there, an overall social impact of a single author can be determined taking into account the different mediums in which the author conveys information.

Figure 4:
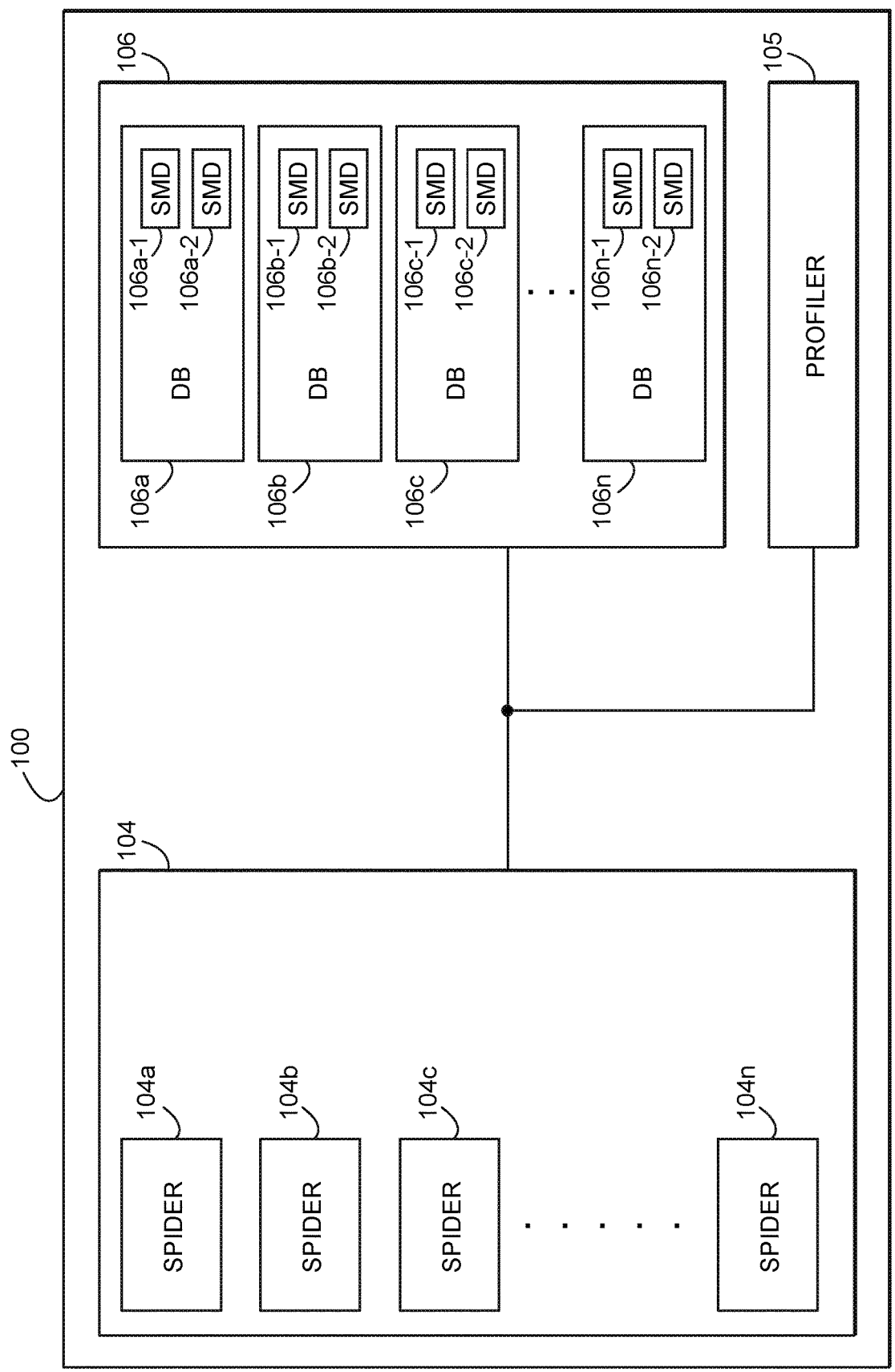
FIG. 4 is a block diagram of an example embodiment of one or more spiders interacting with a profiler and one or more databases.

FIG. 4 shows a diagram of one or more spiders 104*a-n* interacting with a profiler 105 and one or more databases 106*a-n* in the apparatus 100. As explained above, the spiders 104*a-n* are deployed to trawl web-sites and social media platforms to gather both author posts and information about the authors. Upon retrieving the author post data and the author profile data, a profiler 105 compares the data with respect to data stored in one or more databases 106*a-n*. As can be seen in FIG. 4, the databases 106*a-n* store both the social media data 106*a*-1-106*n*-1 and the social media profile data 106*a*-2-106*n*-2.

The profiler 105 can be configured to match the data retrieved from the spiders 104*a-n* with data stored in the databases 106*a-n*. Using the example from above, a comedian may have a Facebook® account where he makes several posts daily. This data may be previously stored in the databases 106*a-n* where both the author posts and the profile information of the author are stored in the databases, respectively. As mentioned above, the very same comedian may decide to open a Twitter® account where the Twitter® account may have an author name that is not at all similar to the user name on Facebook®. In this example, information related to the author's Facebook® account as well as the author posts may be stored in one or more databases 106*a-n* where information from Twitter® may not have yet populated the databases 106*a-n*.

Thus, when the spiders 104*a-n* acquire the author post data/compositions and the profile information from Twitter®, the profiler 105 can compare the background information of the author on Twitter® to background information of authors stored in the one or more databases 106*a-n*. Upon finding a successful match, the apparatus 100 may then associate the comedian's Twitter® posts with his Facebook® posts, thus providing a more robust sentiment analysis of the author posts as the apparatus 100 has the ability to analyze social media data from various different social media platforms and associate the data with a single author. It should be appreciated that the data from various accounts (e.g., Twitter®, Facebook®) may already be stored in the one or more databases 106*a-n* and the profiler 105 can still link this data in the same manner as it would as though it were processing the data from the spiders 104*a-n*. Upon linking the author across different accounts, a single author identity exists in which that author's overall social impact can be determined.

Figure 5:
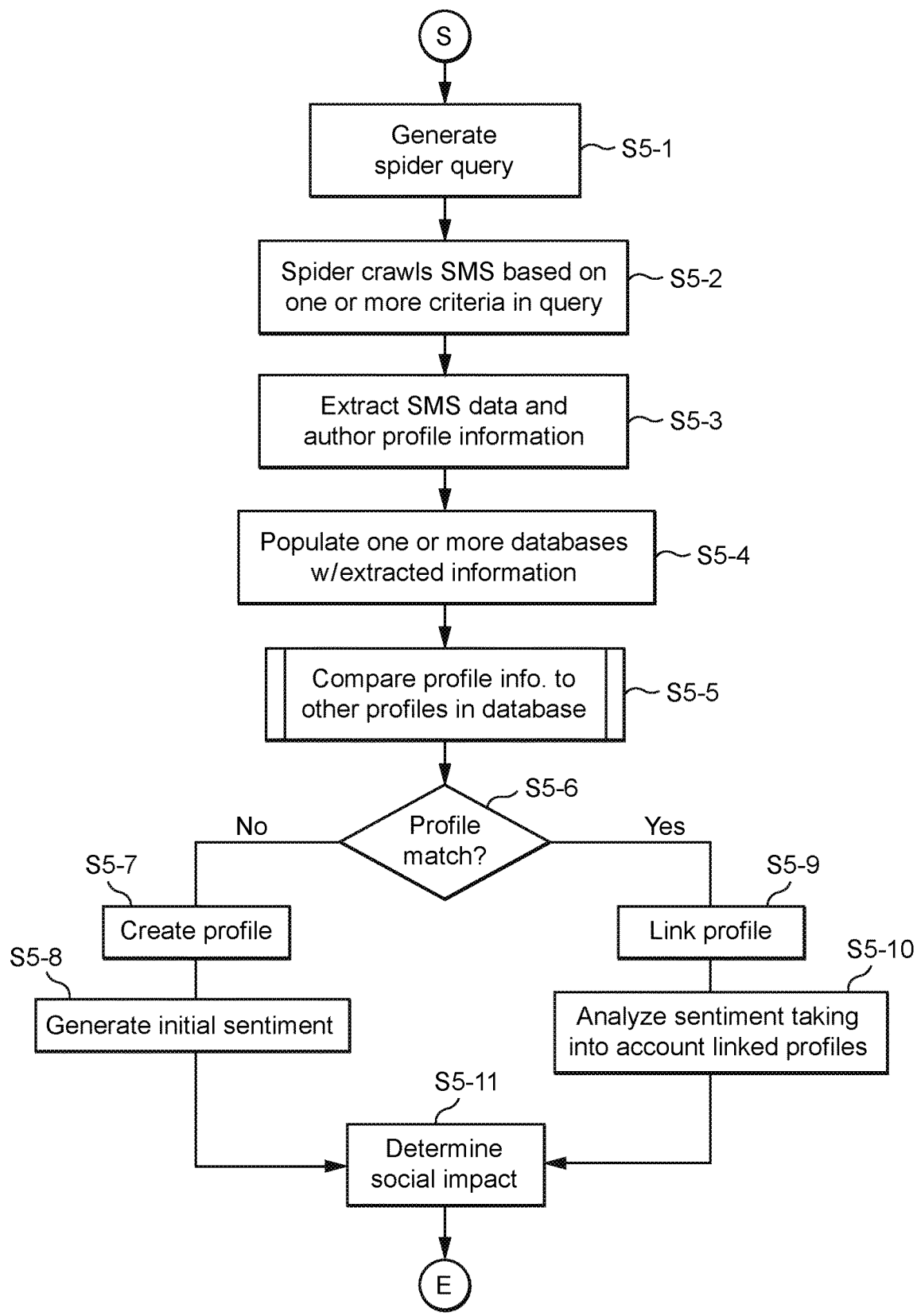
FIG. 5 is an example application flowchart showing a flow of processes for a social profiling system.

FIG. 5 shows an application flowchart for a flow of processes for a social profiling system. The process begins when a query is generated directing a spider both where and for what to search (S5-1). The spider is deployed to a social media source (e.g., Twitter®) where various information is accessed from the source based on one or more criteria set out in the query (S5-2). The spider can retrieve social media data, such as an author post on Facebook® or Twitter® or a blog entry on a web-site as well as access and retrieve information from an author profile on the social media source (S5-3). That is, the spider can retrieve information such as the author name as well as the author's full legal name, gender, ethnicity, date of birth, place of birth, current residence, etc.

The extracted information can be used to populate information in one or more databases (S5-4). From there, the information can be compared to other profile information in the one or more databases (S5-5), further details of which will be discussed with respect to FIG. 6.

If there is no match (S5-6) between the profile information received by the spiders and profile information in the one or more databases, a profile can be created (S5-7) and stored in the one or more databases for future analysis. An initial sentiment will then be performed with respect to the newly created profile (S5-8).

If a match is found (S5-6), then the profile will be linked with a profile in the one or more databases (S5-9). Thus, a single author will be associated with social media data spanning multiple, different social media platforms. From there, sentiment can be compared to and analyzed with respect to sentiment data previously stored in the one or more databases (S5-10). So for example, if an author normally posts positive reviews about products from a particular company on Facebook® and the author makes a generally negative comment about the company on Twitter®, the analysis will not be performed in a vacuum and will take into account previous author posts on Facebook®. Thus, the sentiment analysis will be generated in view of the author's already established sentiment on the other, different social media platforms and an overall social impact of the author will be determined (S5-11).

In generating the sentiment value (S5-10), sentiment of the author can be scored taking into account the social impact of the author across multiple, different platforms. The scoring of the author can be accomplished through the assignment of a numerical value ranging from −1 to 1, for example, to indicate the sentiment where −1 is a negative sentiment and +1 is a positive sentiment. So, compositions of the author may be scored as discrete arithmetical sums.

Using the example above, an author may have many posts/compositions on Facebook® related to Apple® products where a positive (+1) sentiment has been assigned to the post/composition. This value can be aggregated and associated with the author. So when the same author makes a post/composition on his Twitter® account that is generally negative (−1), this value can be aggregated with the author's already established sentiment via multiple Facebook® posts. Thus, the author can have an aggregated sentiment associated with his posts about Apple® products across multiple, different social media platforms. This aggregated sentiment thus helps determine a single, overall social impact of the author. Also, if a subsequent sentiment is derived from the same author for subsequent compositions relating to the original composition (i.e., comments and additional material relating to the original composition), these will be summed to provide an aggregated score for all of the compositions relating to the original composition in a group of compositions.

Figure 6:
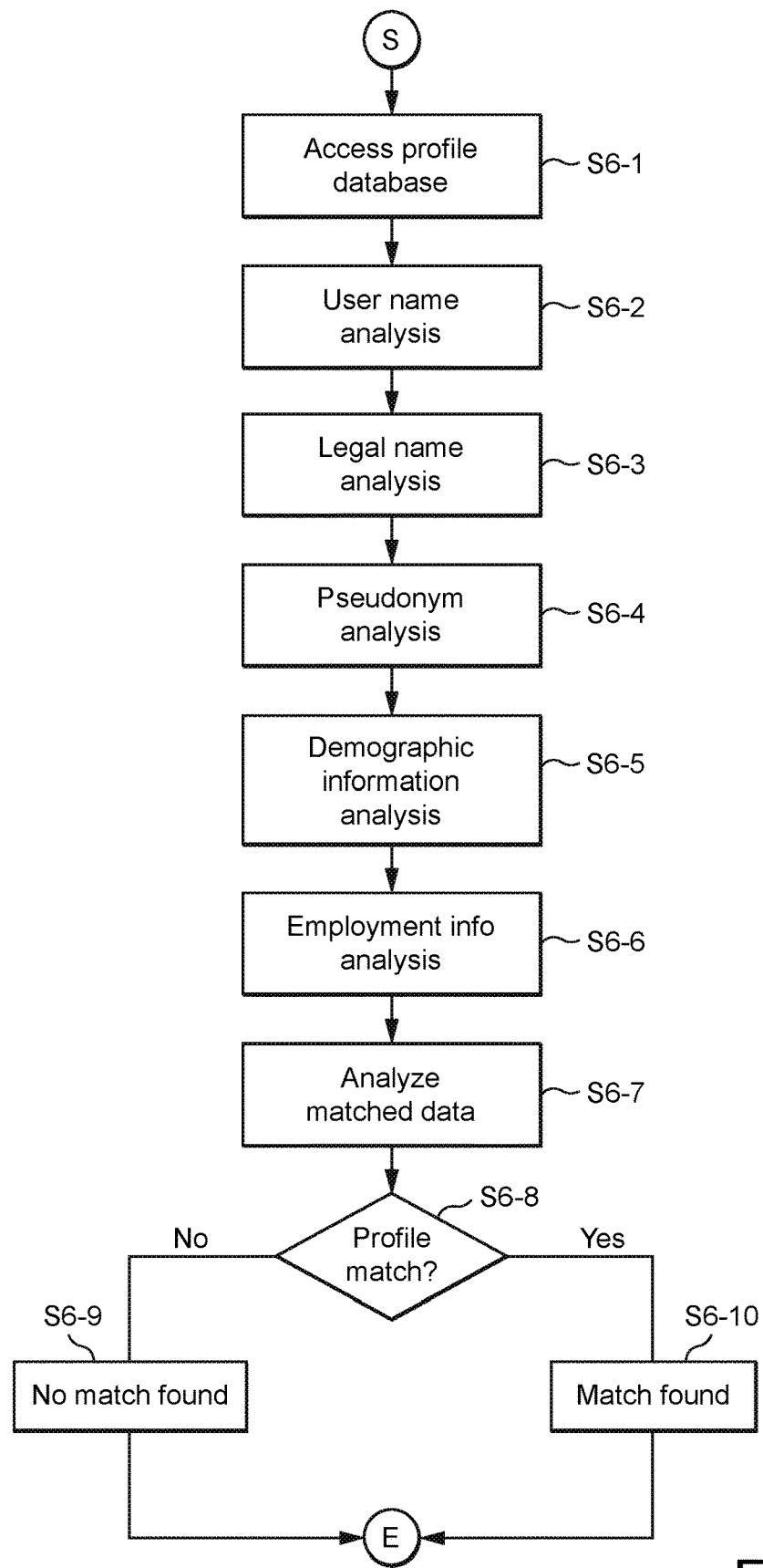
FIG. 6 is an example application flowchart showing a more detailed flow of processes for matching authors.

FIG. 6 shows an example application flowchart for various analysis that can be performed on the profile data with respect to profile data stored in the one or more databases. It should be appreciated that the analysis shown in FIG. 6 is by way of non-limiting example and other various types of analysis may be performed. The profiles are accessed in the one or more databases (S6-1) where various analysis and matching is performed on different aspects of the profile information. A first analysis could be to analyze two user names (S6-2). For example, a user name of John Smith on Facebook® would match exactly with a John Smith on Twitter®. Of course, a user name of jsmith on Twitter® may also be a candidate for a match as it indicates a first initial and last name matching the user name on Facebook®. It should be appreciated that just because a user name may match either exactly or through some equivalent, that does not necessarily mean the profiles will match. That is, in this example, the individual John Smith on Facebook® may be an entirely different individual than John Smith on Twitter®.

Analysis can also be performed on the author's full legal name with each account (S6-3). Using the example above, the author having the author name John Smith on Facebook® may legally be named John Ryan Smith where the author John Smith on Twitter® may legally be named John Michal Smith. Thus, in this example, the John Smith from Twitter® would not match with the John Smith from Facebook®.

Analysis can be further performed using a possible pseudonym of the author (S6-4). In the example where the author may be a relatively famous author, the author may decide to publish certain information under a pseudonym. Thus, a pseudonym associated with the user accounts may be linked to each other as well.

Various information related to demographics may also be analyzed for a match (S6-5). In the example above, John Smith may have identical legal names under both the Facebook® and Twitter® account but still may not be the same John Smith. After analyzing demographic information such as, but not limited to, gender, race, age, disabilities, mobility, home ownership, employment status, and location, the determination of whether they are the same John Smith can be better decided. For example, the John Smith on Facebook® may be a Caucasian male of age 35 and living in Austin, Tex. where the John Smith on Twitter® may be a Caucasian male of age 35 and living in Chicago, Ill. Such a scenario may produce less of a likelihood that they are not the same John Smith. Of course, other information should be analyzed as well as the profiles of John Smith may not be entirely updated. That is, John Smith may have lived in Chicago, Ill. but just did not update his profile on Twitter® as he may now be living in Austin, Tex.

Employment information may also be analyzed to determine if there is a match between profiles (S6-6). For example, the employer name, length of employment, title of the individual at the particular organization in which the individual is employed, or the location of the employer may all be analyzed to determine if there is a match. So once again, John Smith of Facebook® may be employed with Microsoft® in California where John Smith of Twitter® may work at the U.S. Patent and Trademark Office in Alexandria, Va.

Once all of the information has been compared and analyzed (S6-7), the various factors that are alike can be weighed against the various factors that are dissimilar and the determination of a match can then be made (S6-8). If no match is found (S6-9), a NO MATCH FLAG is set and the process ends where if a match is found (S6-10) a MATCH FLAG is set and the process also ends.

While the technology has been described in connection with what is presently considered to be practical and preferred embodiments, it is to be understood that the technology is not to be limited to the disclosed embodiments, but on the contrary, is intended to cover various modifications and equivalent arrangements included within the spirit and scope of the appended claims.

The invention claimed is:

1. A method for analyzing and evaluating social media data, to determine a social impact of author comments on one or more topics, the method comprising:
   at an information processing apparatus having a memory and a processor:
      obtaining profile information and posts made by a first author and a second author on at least first and second social media platforms;

storing the obtained profile information and posts in a database memory of the system;
determining a first sentiment on a first topic from a first post by the first author using the first social media platform;
determining a second sentiment on the first topic from a second post by the second author using the second social media platform;
determining whether the first author is the same author as the second author by comparing the obtained profile information of the first author and the second author;
linking the first author to the second author when the first and second authors are determined to be the same author;
upon linking the first author to the second author, assigning a weighted value to the first post by the first author based on topics the first author posts about, likely influence of the first author over followers, or a volume of audience for the first author, wherein the weighted value is more weighted toward the first sentiment when the first author normally provides a first type of review on the first topic, and the weighted value is more weighted toward the second sentiment when the first author normally provides a second type of review, different from the first type of review, on the first topic;
aggregating the first sentiment and the second sentiment and
determining an overall social impact of the first author based on the aggregated first and second sentiment.

2. The method of claim 1, wherein determining that the first author is the same as the second author includes analyzing any of a name of the first and second author, demographic information of the first and second author, and employment information of the first and second author, wherein the name, demographic information, and employment information of the first and second author are contained in the obtained profile information.

3. The method of claim 2, wherein analyzing the name of the first and second author includes analyzing any of a user name of the first and second author, a full legal name of the first and second author, and a pseudonym of the first and second author.

4. The method of claim 2, further comprising:
weighing similarities between any of the name, demographic information, and employment information of the first and second author against differences between any of the name, demographic information, and employment information of the first and second author; and
determining that the first author is the same as the second author based on a result of weighing the similarities against the differences.

5. The method of claim 1, wherein the weighted value is more negatively weighted when the first author normally provides positive reviews on the first topic, and the weighted value is more positively weighted when the first author normally provides negative reviews on the first topic.

6. The method of claim 1, further comprising:
deploying one or more software web crawlers customized to at least first and second social media web-sites to search content of profile pages on each of the first and second social media web-sites and obtain the profile information and posts made by the first author and the second author on the first and second social media web-sites.

7. A system, comprising:
a processor; and
a memory configured to store computer readable instructions that, when executed by the processor, cause the system to:
obtain profile information and posts made by a first author and a second author on at least first and second social media platforms;
determine a first sentiment on a first topic from a first post by the first author using the first social media platform;
determine a second sentiment on the first topic from a second post by the second author using the second social media platform;
determine whether the first author is the same author as the second author by comparing the obtained profile information of the first author and the second author;
link the first author to the second author when the first and second authors are determined to be the same author; and
upon linking the first author to the second author, assign a weighted value to the first post by the first author based on topics the first author posts about, likely influence of the first author over followers, or a volume of audience for the first author, wherein the weighted value is more weighted toward the first sentiment when the first author normally provides a first type of review on the first topic, and the weighted value is more weighted toward a-the second sentiment when the first author normally provides a second type of review, different from the first type of review, on the first topic.

8. The system of claim 7, wherein determining that the first author is the same as the second author includes analyzing any of a name of the first and second author, demographic information of the first and second author, and employment information of the first and second author, wherein the name, demographic information, and employment information of the first and second author are contained in the obtained profile information.

9. The system of claim 8, wherein analyzing the name of the first and second author includes analyzing any of a user name of the first and second author, a full legal name of the first and second author, and a pseudonym of the first and second author.

10. The system of claim 8, wherein the system is further caused to:
weigh similarities between any of the name, demographic information, and employment information of the first and second author against differences between any of the name, demographic information, and employment information of the first and second author; and
determine that the first author is the same as the second author based on a result of weighing the similarities against the differences.

11. The system of claim 7, wherein the weighted value is more negatively weighted when the first author normally provides positive reviews on the first topic, and the weighted value is more positively weighted when the first author normally provides negative reviews on the first topic.

12. The system of claim 7, wherein the system is further caused to:
deploy one or more software web crawlers customized to at least first and second social media web-sites to search content of profile pages on each of the first and second social media web-sites and obtain the profile information and posts made by the first author and the second author on the first and second social media web-sites.

13. A non-transitory computer readable storage medium having computer readable instructions stored therein which, when executed by a processor of a system, cause the system to provide execution comprising:

obtaining profile information and posts made by a first author and a second author on at least first and second social media platforms;

processing the profile information and posts from the one or more software web crawlers and store the processed profile information and posts in a database memory of the social media profiling system;

linking the first author to the second author when the first and second authors are determined to be the same author;

determining a first sentiment on a first topic from a first post by the first author using the first social media platform;

determining a second sentiment on the first topic from a second post by the second author using the second social media platform; and assigning a value to the first and second posts by the first author based on topics the first author posts about, likely influence of the first author over followers, or a volume of audience for the first author, wherein the value is more weighted toward a-the first sentiment when the first author normally provides a first type of review on the first topic, and the value is more weighted toward the second sentiment when the first author normally provides a second type of review, different from the first type of review, on the first topic.

14. The non-transitory computer readable storage medium of claim 13, wherein determining that the first author is the same as the second author includes analyzing any of a name of the first and second author, demographic information of the first and second author, and employment information of the first and second author, wherein the name, demographic information, and employment information of the first and second author are contained in the obtained profile information.

15. The non-transitory computer readable storage medium of claim 14, wherein analyzing the name of the first and second author includes analyzing any of a user name of the first and second author, a full legal name of the first and second author, and a pseudonym of the first and second author.

16. The non-transitory computer readable storage medium of claim 14, wherein the system is further caused to provide execution comprising:

weighing similarities between any of the name, demographic information, and employment information of the first and second author against differences between any of the name, demographic information, and employment information of the first and second author; and determining that the first author is the same as the second author based on a result of weighing the similarities against the differences.

17. The non-transitory computer readable storage medium of claim 15, wherein the value includes a weighted value assigned to the first post by the first author, and the weighted value is more negatively weighted when the first author normally provides positive reviews on the first topic, and the weighted value is more positively weighted when the first author normally provides negative reviews on the first topic.

18. The method of claim 1, wherein the first sentiment produces a first value when the first author of the first post is the same as the second author of the second post, and produces a second value different from the first value when the first author is different from the second author.

19. The method of claim 1, wherein determining if the first author is the same as the second author includes weighing factors that are alike between the first and second authors against factors that are dissimilar between the first and second authors.

20. The method of claim 1, wherein the first social media platform includes a press relations platform associated with one or more journalists.

* * * * *